(No Model.) 6 Sheets—Sheet 4.
J. E. GAYLORD, W. G. COLE & H. A. KELLER.
ROASTING FURNACE.

No. 579,536. Patented Mar. 23, 1897.

(No Model.) 6 Sheets—Sheet 6.

J. E. GAYLORD, W. G. COLE & H. A. KELLER.
ROASTING FURNACE.

No. 579,536. Patented Mar. 23, 1897.

UNITED STATES PATENT OFFICE.

JARED E. GAYLORD, WILLIAM G. COLE, AND HERMANN A. KELLER, OF BUTTE, MONTANA; SAID COLE ASSIGNOR TO ARTHUR HARVEY WETHEY, OF SAME PLACE.

ROASTING-FURNACE.

SPECIFICATION forming part of Letters Patent No. 579,536, dated March 23, 1897.

Application filed March 10, 1894. Serial No. 503,151. (No model.)

*To all whom it may concern:*

Be it known that we, JARED E. GAYLORD, WILLIAM G. COLE, and HERMANN A. KELLER, of Butte city, in the county of Silver Bow and State of Montana, have invented certain new and useful Improvements in Roasting-Furnaces; and we do hereby declare the following to be a full, clear, and exact description of the invention, such as will enable others skilled in the art to which it appertains to make and use the same.

Our invention relates to an improvement in roasting-furnaces, and more particularly to that class of furnaces for drying, desulfurizing, cooling, or chloridizing ores or furnace products in which a series of hearths are arranged one above the other and which communicate through alternate openings or passages near their ends, each hearth being provided with a rake or plow for the purpose of mechanically stirring or agitating and propelling the bedded material along each hearth and to successively discharge it upon the hearth below until the roasted material passes out through the discharge-opening in the lowest hearth.

The object of the present invention is to produce simple and efficient means located exteriorly of the hearths for properly, automatically, and effectually operating the rakes.

A further object is to so construct and arrange the furnace and the rakes that the latter will be cooled through the medium of the natural draft of the furnace.

A further object is to provide a roasting-furnace with an opening in its wall for the passage of the rake-shanks with simple and efficient means for maintaining said openings closed and yet permit the free passage of the rake-shanks.

A further object is to produce simple and efficient means whereby to positively and automatically operate the mechanism of a roasting-furnace.

A further object is to produce a roasting-furnace which shall be simple in construction and which shall be automatic and effectual in the performance of its functions.

With these objects in view the invention consists in certain novel features of construction and combinations and arrangements of parts, as hereinafter set forth, and pointed out in the claims.

In the accompanying drawings, Figs. 3, 4, 5, 6, 7, 8, 9, 10, 11, 12, and 13 are detail views.

Figure 1:
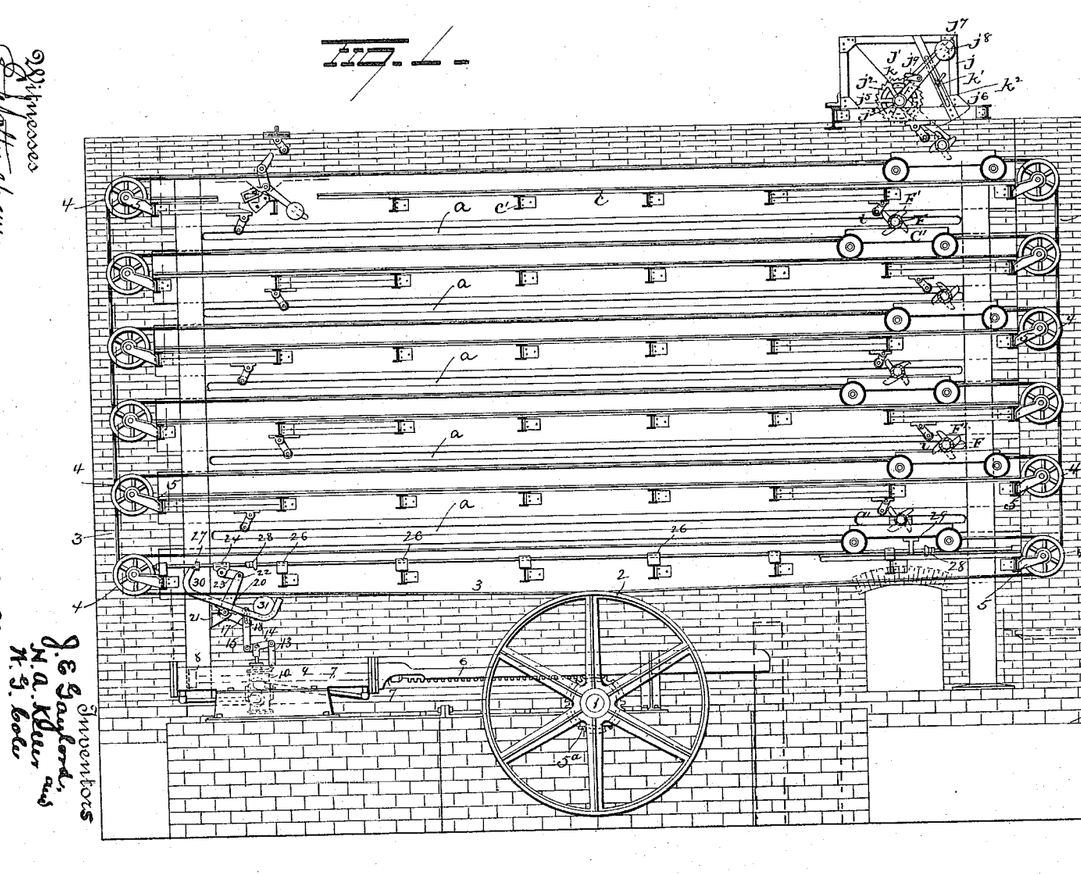
Figure 1 is a longitudinal sectional view of a furnace embodying our improvements.
Figure 2:
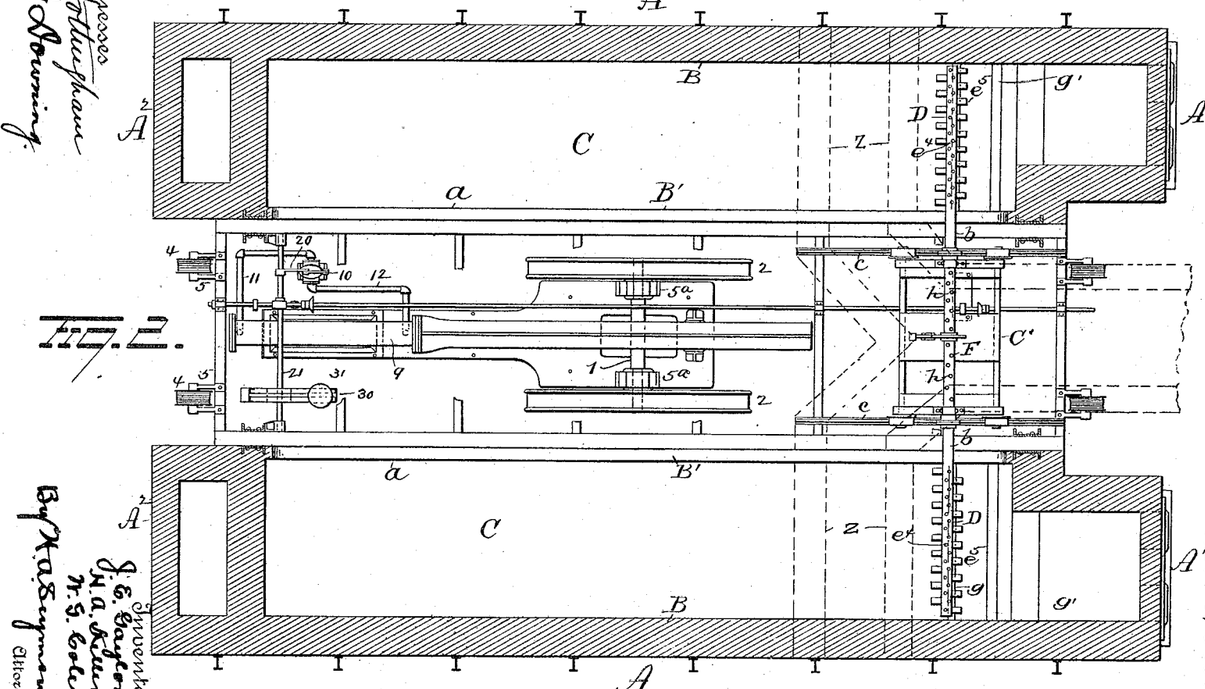
Fig. 2 is a horizontal sectional view.
Figures 5, 6, 7, 12:
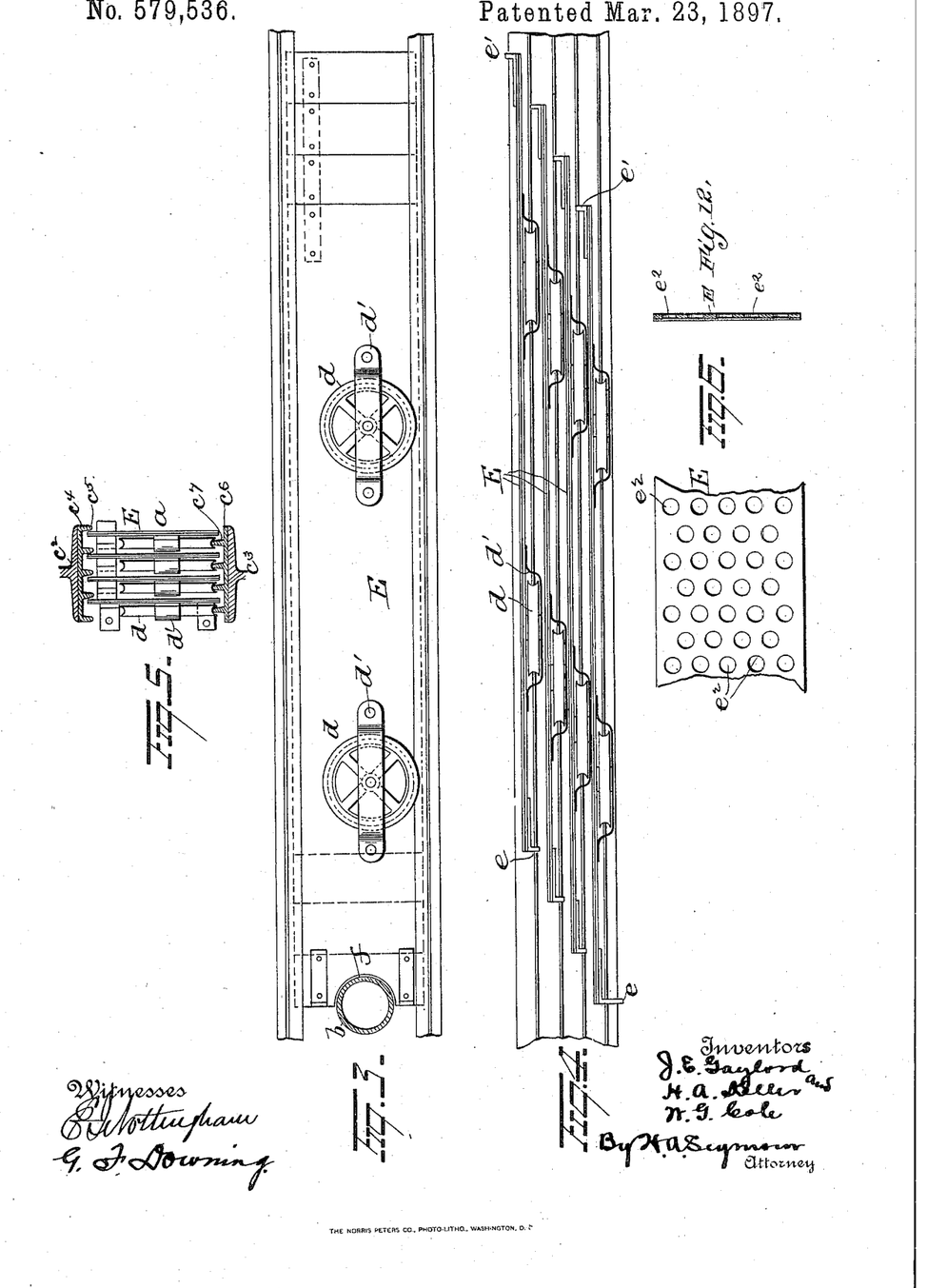
Figures 7, 8:
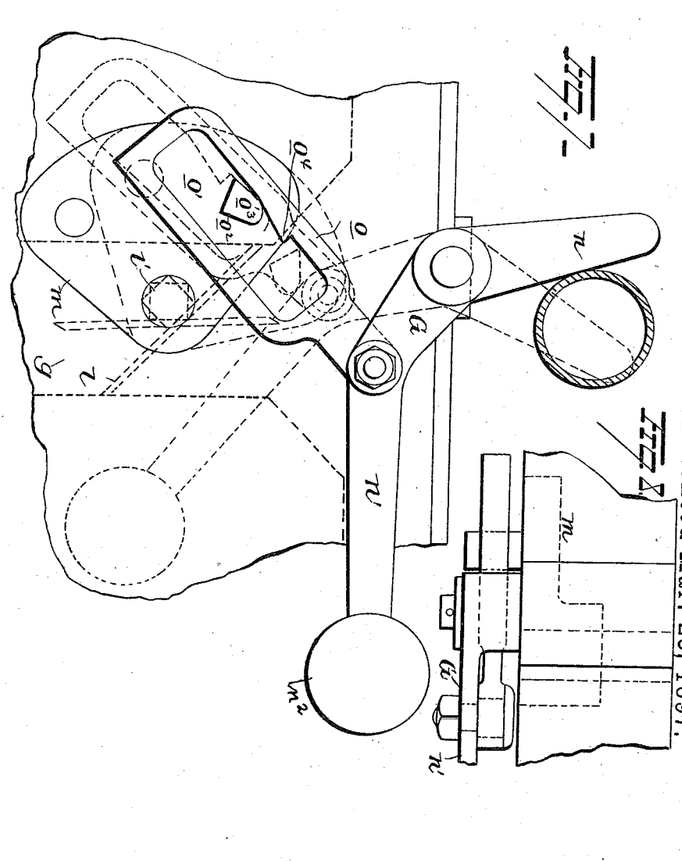
Figure 9:
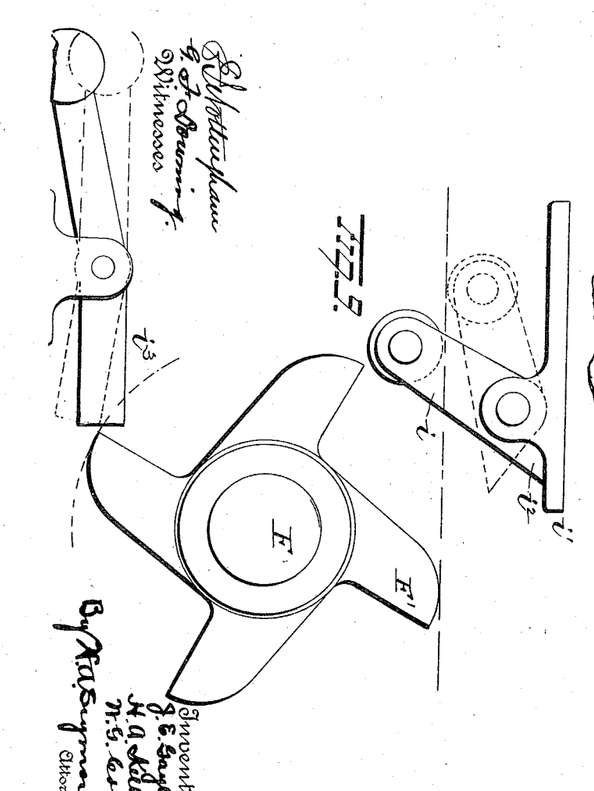
Figure 10:
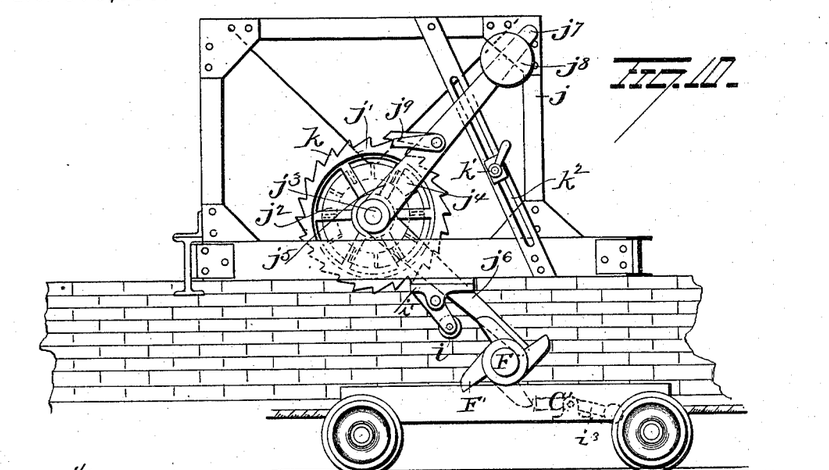
Figure 11:
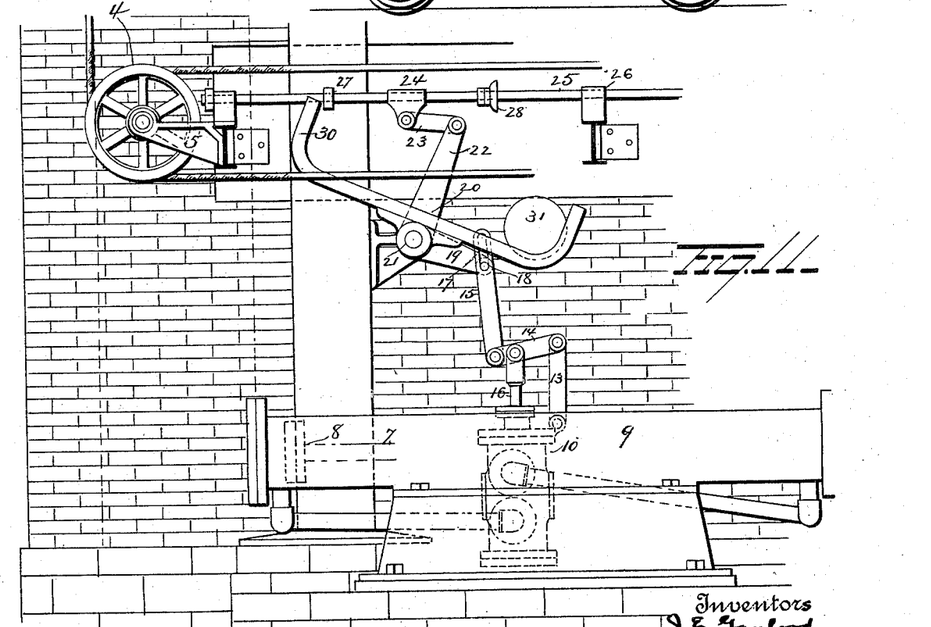
Figure 13:
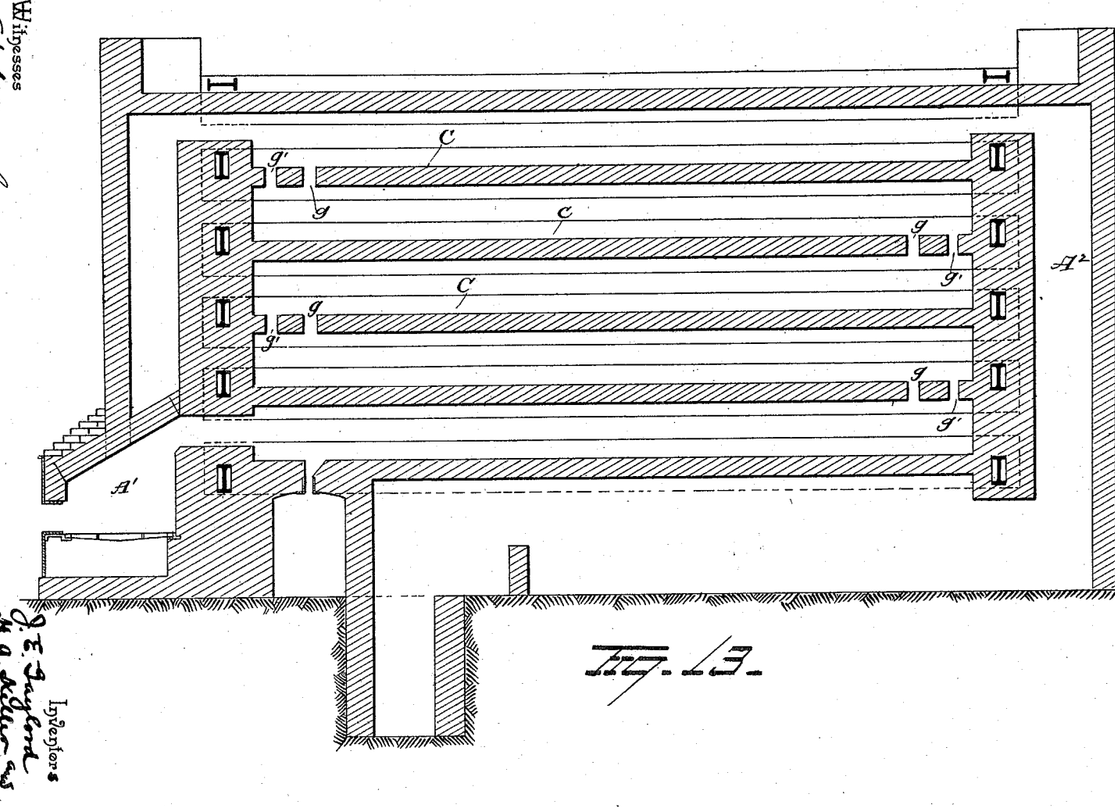

In carrying out our invention we make use of two separate, preferably rectangular, structures, each having a series of horizontal communicating hearths. A number of reciprocating rakes are provided, one for each hearth, and these rakes are carried by trucks adapted to run on tracks located between the structures, if, as illustrated, the slots in the furnace are located in the inner wall thereof. Our apparatus thus comprises two parts—viz., stationary structures or furnaces and operating mechanism.

A A represent the two rectangular structures composing the furnaces, each having an outer wall B and an inner wall B'. Between the inner and outer walls of each structure a series of hearths or levels C are located. At one end of each structure a firebox A' is located, from which artificial heat may be introduced at any of the hearths or levels, preferably each second level, and with the upper hearth or level of each structure, at the other end thereof, a downtake $A^2$ communicates. The inner walls B' are provided with elongated slots or openings $a$ for the accommodation of rakes D D, which extend over the hearths C, the shanks $b$ of said rakes projecting through said elongated slots and are supported and carried by means of trucks C', adapted to run on tracks $c$, mounted between the structures A A on I-beams $c'$, which latter also serve as bracers for the inner walls of the structures.

The elongated openings $a$ are provided above and below with I-beams $c^2 c^3$. On the I-beams $c^2 c^3$ of each opening $a$ plates $c^4 c^6$, each having a series of ribs or tracks $c^5 c^7$, are located. Located in each opening $a$ in the inner walls of the furnace are two series of slides E, adapted to close said openings, each series preferably comprising four parallel slides and one series of slides being arranged in line with the other series. The upper edges of the slides E are disposed between the ribs $c^5$ of the upper plate $c^4$ and are supported by means of rollers $d$, connected thereto by means of brackets $d'$, said rollers being adapted to run on the ribs or tracks $c^7$. The ends of each slide are provided with laterally-projecting shoulders $e$ $e'$, the shoulders $e$ projecting in the opposite direction from the shoulders $e'$.

At the meeting point of the inner slides of the two series recesses $f$ are made for the accommodation of the shank of one of the rakes, and when said rake is at the starting-point of the hearth over which it operates the slides of one series will be parallel with each other and projected beyond one end of the hearth, while the other series will be disposed end to end and extend from one end of the hearth to the other. Now when the truck carrying said rake is moved the rake will be carried over the hearth from end to end of the furnace, propelling and agitating the ore on the hearth and causing it to discharge through the opening $g$ at the end of said hearth onto the next hearth beneath. When this occurs, the slides of the series which first closed the opening $a$ will be moved longitudinally, one after another, and when the rake reaches the end of its stroke said series of slides will be collapsed, or, in other words, they will be parallel with each other and projected beyond the end of the slot or opening. During this operation the series of slides which were projected beyond the starting end of the slot or opening will be pulled along as the rake moves forward, one slide after another, the shoulders $e$ of one slide engaging the shoulders $e'$ of the adjacent slide for this purpose, thus maintaining the opening $a$ in the wall of the furnace closed as the rake moves forward from end to end of the hearth. When the rake returns to its normal or starting position, the reverse of the above-described movements of the slides will occur. In constructing these slides we prefer to make them of light sheet-iron provided with holes $e^2$ and lined with asbestos or other non-conducting material.

Each truck C carries one hollow shaft F, projecting its ends over adjacent hearths of the two furnace structures, which ends are each provided with two sets of teeth $e^5$, and thus constitute the rakes D, while the intermediate portion of said hollow shaft constitutes the shanks $b$ of said rakes. The hollow rake-heads (formed by the ends of the shaft F) are perforated, as at $e^4$, as is also the intermediate portion of said shaft, as at $h$, said intermediate portion being located in the space between the two furnace structures. By thus arranging the rakes they will be cooled through the medium of the natural draft of the furnace, the heated draft over the hearths producing sufficient suction to cause the cool air between the furnace structures to enter the perforations $h$ and escape through the perforations $e^4$ in the rake-heads. It is not necessary to provide the upper or drying rakes with these perforations.

The ore will be fed onto the top or drying-hearth at one end of each furnace structure, where it will meet the rakes over the upper or drying-hearths and by said rakes be caused to move to the opposite ends of said hearths, where it will discharge through the openings $g$ onto the next hearth, which is the first roasting-hearth, where it will be treated in a like manner, and so on until it has passed over all the hearths of the structure in which it started.

In order to prevent the teeth of the rakes from acting to move the ore backwardly when they are returning to the starting-point, each hollow shaft F is provided with a fixed star-wheel F', which when the hollow shaft reaches the forward end of its movement engages an arm $i$, pivoted to a fixed bracket $i'$. The arm $i$ is made with a shoulder $i^2$, adapted to engage the bracket $i'$, so that when said arm is engaged by the star-wheel F', as the hollow shaft reaches the end of its movement, said arm will not turn on its pivotal support. Thus the star-wheel will be made to turn, and said star-wheel being fixed to the hollow shaft the rakes will be given a quarter-revolution, whereby their teeth will be made to assume a horizontal position, in which position they cannot act on the ore on the hearth while the rakes are making their return movement. As the rake-shaft begins its backward movement the star-wheel will ride past the arm $i$ (the latter turning on its fulcrum) and the star-wheel will be prevented from turning by means of a pivoted weighted dog $i^3$, carried by the truck. When the rakes again reach their starting-point and again begin their forward movement, they will be again automatically turned by the arm $i$ at that end of the hearth to cause the teeth to assume their working positions, the resistance of the ore keeping the star-wheel tightly against the dog.

To provide simple and efficient means for feeding the ore to the apparatus automatically, the devices now to be described will be located on each furnace structure at the starting end thereof. A frame $j$ is mounted on each furnace, and to this frame a hopper $j'$ is secured and adapted to discharge into the compartments of a revoluble wheel $j^2$, fixed on a shaft $j^3$. An angular lever $j^4$ is secured at one end $j^5$ to the shaft $j^3$, one arm $j^6$ of said lever depending and terminating in the line of travel of the hollow rake-shaft carried by the uppermost truck C', and the other arm $j^7$ projecting upwardly and provided with a weight $j^8$, whereby to maintain the depending arm $j^6$ at the forward extremity of its throw. The arm $j^7$ has a dog $j^9$ pivoted to it at such a point as to engage a ratchet-wheel $k$, carried by the compartment-wheel $j^2$. Now it will be seen that when the truck carrying the upper rake-shaft approaches the end of its return movement said shaft will engage the depending arm of the lever $j^4$, and as said truck completes its return movement the compartment-wheel $j^2$ will be made to turn and one or more of its compartments will discharge its contents onto the upper or drying hearth of the furnace. The ore thus discharged onto the hearth will then be ready to be carried forward to the other end thereof by the rakes, as above explained. In order to regulate the extent of movement of the compartment-wheel at each return movement of the truck and thus gage the feed of ore to the furnace, we provide an adjustable stop $k'$, carried by a fixed slotted bar $k^2$ and adapted to be engaged by the weighted arm of the lever $j^4$.

Besides the openings or drop-holes $g$, above alluded to, each hearth will be provided with an opening $g'$, whereby to facilitate the escape of all gases.

The discharge-openings of the upper or drying hearths will each be provided with a valve $l$, adapted to be operated automatically by the rake-shafts, the construction and operation of which valves are as follows:

The valve $l$ is carried by a shaft $l'$, mounted in the end walls of said discharge-opening, and also secured to this shaft is a plate $m$, preferably triangular in form. An angular lever G is pivotally supported in the walls of the furnace, the arm $n$ of said lever projecting into the path of the hollow rake-shaft and the arm $n'$ of said lever being provided with a weight $n^2$. A plate $o$, having an elongated slot $o'$, is pivotally connected at one end to the arm $n'$ of lever G, between the ends of said arm. A lug $o^2$, having a curved face $o^3$, projects from the triangular plate $m$ into the slot $o'$ of plate $o$, and is adapted to engage a tooth $o^4$, projecting from said plate $o$ into the slot $o'$. Now when a truck carrying a rake-shaft reaches the end of its movement said rake-shaft will engage the upwardly-projecting arm $n$ of the lever G and cause it to turn on its fulcrum against the resistance of the weight $n^2$. When the lever is thus turned, the slotted plate $o$ will move upwardly in a diagonal direction, and the tooth $o^4$, engaging the lug $o^2$, will cause the triangular plate $m$ to be turned, thus opening the valve $l$ to permit the discharge of ore from the drying-hearth to the first roasting-hearth below. When the rake-shaft leaves the arm $n$ on its return movement, the lever G and slotted plate $o$ will be automatically returned to their normal positions through the medium of the weight $n^2$, but the valve $l$ will remain open as long as the ore is passing through the opening $g$. When the ore shall have ceased to pass through said opening, the valve will be automatically closed by the weight of the triangular plate $m$.

It now only remains to describe the mechanism by means of which the carriages or trucks carrying the rakes are moved back and forth and the manner in which said mechanism is operated, and this explanation will now follow.

A shaft 1 is mounted in suitable framework in the space between the two furnace structures and carries (preferably two) grooved wheels or drums 2 2, about which a number of ropes 3 pass, said ropes also passing about pulleys 4, carried by brackets 5, secured to the end braces of the furnace structures, one end of each rope being secured to the respective ends of a truck $C'$, two ropes being preferably secured to each truck. Thus it will be seen that when the wheels 2 are rotated in one direction the trucks will move from end to end of the furnace and that when said wheels are rotated in the reverse direction said trucks will be returned to their starting-points.

The shaft 1 carries pinions $5^a$, adapted to mesh with and receive motion from sliding rack-bar 6, mounted in suitable framework, one end of said rack-bars terminating in a piston-rod 7, carrying a piston 8, adapted to operate in a hydraulic cylinder 9, also located between the furnace structures near one end thereof.

A valve-chamber 10 is located in proximity to the hydraulic cylinder and communicates by means of pipes 11 12 with the respective ends of said hydraulic cylinder. Within the valve-chamber a valve is located and adapted to open communication with the pipes 11 12 alternately, so that water will be admitted to one end of the cylinder to drive the rack-bars in one direction to rotate the wheels 2 in one direction and so that when the valve is reversed water will be admitted to the other end of the cylinder for the purpose of rotating the wheels 2 in the reverse direction. A vertical link 13 is pivoted at one end to the valve-casing and at the other end to a nearly horizontal link 14, the other end of said horizontal link having a vertical link 15 pivoted to it, the valve-stem 16 being pivotally connected to the horizontal link, preferably at a point in proximity to the connection of the latter to the link 15. The upper end of the vertical link 15 is made with an elongated slot 17 for the reception of a pin 18, projecting from the arm 19 of a bell-crank lever 20, said bell-crank lever being carried by a shaft 21. The upwardly-projecting arm 22 of the bell-crank lever 20 has a link 23 pivotally connected to it, and the other end of said link 23 is pivotally connected to a bracket 24, secured to a rod 25. The rod 25 extends from end to end of the furnace and is mounted to have a longitudinally-sliding movement in a series of brackets 26. The rod 25 is also provided with a stop 27, whereby to limit its longitudinal movement. The rod 25 also carries, at a point in proximity to both ends, buttons 28, adapted to be struck by an arm 29, depending from the lower truck $C'$, whereby to move the rod 25 longitudinally for a purpose presently explained.

A bracket 30 is secured at a point between its ends to the shaft 21 and is normally disposed in a diagonal position and adapted to support a rolling ball 31. When the lower truck C' reaches the forward end of its movement, the depending arm 29 will strike the button 28 at that end of the rod 25 and move said rod longitudinally, whereupon the shaft 1 will be turned a distance permitted by the length of the slot 17 in the link 15, which movement is sufficient to move the bracket 30 far enough to cause the ball 31 to roll to the other end thereof, by which means the shaft 21 is turned far enough to operate the valve in the valve-chamber 10 through the medium of the various links, above described, thus causing a reversal of rotation of the wheels 2 2 and returning the trucks to their starting positions, as above described. When the trucks reach their starting position, the arm 29, depending from the lower truck, will strike the button 28 at that end of the rod 25 and move said rod longitudinally to operate the valve and reverse the movement of the trucks in the same manner as above explained.

Z represents flues whereby communication can be had to a suitable dust-chamber.

Our improvements are comparatively simple in construction and effectual in the performance of their functions.

Various slight changes might be made in the details of construction of our invention without departing from the spirit thereof or limiting its scope, or one furnace structure may be employed instead of two, and hence we do not wish to limit ourselves to the precise details of construction herein set forth; but, Having fully described our invention, what we claim as new, and desire to secure by Letters Patent, is—

1. In a roasting-furnace, the combination with a hearth having a slot in one wall thereof, of a rake disposed over said hearth and having a shank projecting through said slot, said rake head and shank being hollow and having perforations therein extending throughout their length, substantially as set forth.

2. In a roasting-furnace, the combination with two parallel hearths spaced apart and each having a slot in its wall, of a hollow shaft projecting over said hearths and through the space between the same, said shaft being perforated throughout the length of its ends and its intermediate portion, and rake-teeth on the ends of said shaft, substantially as set forth.

3. In a roasting-furnace, the combination with two furnace structures spaced apart and each having a hearth and each hearth having a slotted inner wall, of a truck adapted to travel in the space between said furnace structures, a shaft mounted on said truck and projecting at its ends over the hearths, said shaft being hollow and having perforations at its ends and at its intermediate portion and rake-teeth on the ends of said shaft, substantially as set forth.

4. In a roasting-furnace, the combination with a series of communicating hearths and a rake adapted to move over each hearth, of a valve in the opening between two hearths, and means for automatically opening and closing said openings as the rakes approach and recede from the same, substantially as set forth.

5. In a roasting-furnace, the combination with a hearth, a truck located exteriorly of said hearth and a rake carried by said truck and projecting over said hearth, said hearth having an outlet-opening at one end thereof, of a valve located in said outlet-opening, and devices connected with said valve and adapted to be operated by said rake to automatically open and close the same, substantially as set forth.

6. In a roasting-furnace, the combination with a hearth having an outlet-opening at one end and a traveling rake, of a valve in said outlet-opening, a weight adapted to maintain said valve normally closed, and devices connected with said valve and adapted to be operated by said traveling rake, whereby to automatically open said valve, substantially as set forth.

7. In a roasting-furnace, the combination with a hearth having an outlet-opening at one end thereof, and a traveling rake, of a valve in said outlet-opening, a weight adapted to maintain said valve normally closed, a pivoted weighted lever adapted to be struck by said rake, and a plate connected to said lever and adapted to operate the weight on the valve to open the latter, substantially as set forth.

8. In a roasting-furnace, the combination with a hearth having an outlet-opening at one end thereof, and a traveling rake, of a valve adapted to close said outlet-opening, a plate or weight secured to said valve and adapted to maintain it normally closed, a lug projecting from said plate or weight, a pivoted lever having a weight at one end, said pivoted lever being adapted to be turned by said rake, a plate pivotally connected to said lever and having a slot therein and a tooth projecting into said slot and adapted to engage the lug on said plate or weight, substantially as set forth.

9. In a roasting-furnace, the combination with two series of hearths, a series of trucks adapted to run alongside said hearths and between the series and a laterally-projecting rake carried by each truck and adapted to project over the adjacent hearth, of a revoluble drum, ropes wound about said drum located in the space between the series of hearths and connected at their ends to the respective ends of the trucks, a motor located in said space adapted to positively propel said drum, and devices in said space constructed and adapted to be operated by one of the trucks to automatically reverse the rotation of said drum when the carriages reach the ends of their movements, substantially as set forth.

10. In a roasting-furnace, the combination with two parallel hearths spaced apart, of a truck adapted to travel between said hearths, a hollow revoluble shaft located on said truck and projecting over both hearths, rake teeth or blades on the ends of said shaft, said shafts having perforations at its ends and at its intermediate portion, a star-wheel secured to said shaft between its ends, and an arm carried by a fixed portion of the furnace and adapted to be engaged by said star-wheel at the ends of the strokes of the truck, whereby to turn said shaft, substantially as set forth.

11. In a roasting-furnace, the combination with a hearth having a slot or opening in its wall extending longitudinally thereof, a truck adapted to run alongside said hearth, and a rake carried by said truck and adapted to project laterally therefrom over said hearth, of a wheel or drum, a rope passing about said wheel or drum and connected at its ends to said truck, a pinion carried by the shaft of said wheel or drum, a movable rack-bar meshing with said pinion, and adapted to enter a cylinder, a piston on the rack-bar within the cylinder, a valve adapted to control the admission of pressure to the ends of said cylinder alternately, and devices controlled by the truck for automatically operating said valve, substantially as set forth.

12. In a roasting-furnace, the combination with a hearth having an opening in its wall extending longitudinally thereof, a truck adapted to travel alongside said hearth, and a rake carried by said truck and projecting laterally through the opening and over the hearth, of a drum or wheel, a rope on said drum or wheel connected at its ends to said truck, a fluid-pressure motor adapted to impart motion to said wheel or drum, a valve for controlling the admission of pressure to the respective ends of said motor and devices constructed and adapted to be operated by the truck whereby to automatically operate the valve to reverse the movement of the wheel or drum when the truck reaches the ends of its movements, substantially as set forth.

13. In a roasting-furnace, the combination with a hearth, a truck adapted to travel alongside said hearth and a rake carried by said truck and projecting over said hearth, of a motor connected with said truck, a valve for controlling the direction of movement of said motor, a shaft, a bell-crank lever carried by said shaft, links connecting said bell-crank lever with the stem of said valve, a movable rod, a link connecting said movable rod with the bell-crank lever, stops or buttons on said movable rod adapted to be engaged by the truck, a bracket carried by the above-mentioned shaft, and a ball adapted to roll from end to end of said bracket and positively operate the valve to reverse it, substantially as set forth.

14. In a roasting-furnace, the combination with a hearth, having an opening in its inner wall, of a truck adapted to travel alongside said hearth, a revoluble rake carried by said truck and projecting over the hearth, a star-wheel carried by the shank of said rake, an arm pivoted to a fixed portion of the apparatus and adapted to swing in one direction and remain rigid from swinging in the other direction, said arm being in the path of said star-wheel whereby to turn the same and the rake which carries it, when the latter moves in one direction, and a pivoted dog for preventing retrograde movement of said star-wheel and rake, substantially as set forth.

15. In a roasting-furnace, the combination with a hearth having an inlet-opening at one end, a truck adapted to travel alongside said hearth and a rake carried by said truck and projecting over the hearth, of a revoluble compartment-wheel over said inlet-opening of the hearth, a hopper above said compartment-wheel, an L-shaped lever carried by the side of said hopper and having a weight at the extremity of one arm, the other arm of said L-shaped lever projecting in the path of said rake and adapted to be operated by it, a ratchet-wheel carried by said compartment-wheel, and a dog carried by the L-shaped lever and adapted to engage said ratchet-wheel, substantially as and for the purpose set forth.

16. In a roasting-furnace the combination with a hearth having an inlet-opening, a truck adapted to travel alongside said hearth, and a rake carried by said truck and adapted to project over said hearth, of a compartment-wheel over said inlet-opening, an L-shaped lever carried by the shaft of said compartment-wheel, said L-shaped lever being adapted to operate the compartment-wheel and be operated by the movement of the truck, and an adjustable stop adapted to regulate the movement of said L-shaped lever, substantially as set forth.

17. In a roasting-furnace, the combination with a hearth having an elongated opening in its inner wall, a rake projecting over said hearth and having its shank extending through said elongated opening, of collapsible slides adapted to close said elongated opening and permit the passage of the shank of the rake through said opening from end to end of the hearth, substantially as set forth.

18. In a roasting-furnace, the combination with a hearth having an elongated opening in its inner wall for the passage of the shank of a rake, of collapsible slides in said opening adapted to close the same and yet permit the passage of the shank of a rake through it, substantially as set forth.

19. In a roasting-furnace, the combination with a hearth having an elongated slot in its wall for the passage of the shank of a rake, of a series of parallel tracks on the bottom wall of said opening, a series of slides adapted to close said opening and yet permit the passage of the shank of a rake through it, and wheels carried by said slides and adapted to run on said tracks, substantially as set forth.

20. In a roasting-furnace, the combination with a hearth having an elongated opening in its wall for the passage of the shank of a rake, of a series of slides in said opening, said slides being adapted to close the opening and yet permit the passage through it of the shank of a rake, and shoulders at the respective ends of said slides, so constructed and arranged that when one slide is moved by the rake the other slides will be pulled along to close the opening behind the rake, substantially as set forth.

21. In a roasting-furnace, the combination with a hearth having an elongated opening in its wall for the passage of a rake-shank, of tracks in the bottom of said opening, slides adapted to run on said tracks so as to close the opening and yet permit the passage of the rake-shank through it, and guides for said slides, in the top of said opening, substantially as set forth.

22. In a roasting-furnace, the combination with a hearth having an elongated slot in its wall, for the passage of the shank of a rake, of slides adapted to move in said opening, each of said slides being composed of a sheet of perforated metal lined with non-conducting material, substantially as set forth.

23. In a roasting-furnace, the combination with a hearth having an elongated opening in its wall for the passage of the shank of a rake, of two series of slides located in and adapted to slide longitudinally in said elongated slot, parallel tracks for said slides, the respective ends of the slides of each series being adapted to engage each other, and a rake connected to the inner slides of the two series, substantially as set forth.

In testimony whereof we have signed this specification in the presence of two subscribing witnesses.

JARED E. GAYLORD.
WILLIAM G. COLE.
HERMANN A. KELLER.

Witnesses:
ROBT. D. GRANT,
WILBUR G. BENHAM.